US009426865B2

(12) United States Patent
Liu et al.

(10) Patent No.: US 9,426,865 B2
(45) Date of Patent: Aug. 23, 2016

(54) PERSONALIZED LIGHTING FOR OPEN AREA

(71) Applicant: KONINKLIJKE PHILIPS N.V., Eindhoven (NL)

(72) Inventors: Kangjun Liu, Shanghai (CN); Di Lou, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/368,939

(22) PCT Filed: Dec. 22, 2012

(86) PCT No.: PCT/IB2012/057663
§ 371 (c)(1),
(2) Date: Jun. 26, 2014

(87) PCT Pub. No.: WO2013/098759
PCT Pub. Date: Jul. 4, 2013

(65) Prior Publication Data

US 2014/0375230 A1 Dec. 25, 2014

(30) Foreign Application Priority Data

Dec. 31, 2011 (WO) ................ PCT/CN2011/085196

(51) Int. Cl.

| | |
|---|---|
| ***G05B 1/00*** | (2006.01) |
| ***H05B 37/02*** | (2006.01) |
| ***H05B 39/04*** | (2006.01) |
| ***H05B 41/36*** | (2006.01) |
| *H05B 33/08* | (2006.01) |

(52) U.S. Cl.
CPC ............ *H05B 37/02* (2013.01); *H05B 37/0227* (2013.01); *H05B 33/086* (2013.01); *H05B 33/0845* (2013.01); *H05B 37/029* (2013.01)

(58) Field of Classification Search
CPC .... H05B 37/02; H05B 37/029; H05B 33/086; H05B 33/0845; H05B 33/0842; H05B 33/0869; H05B 33/0848; F21K 9/135; F21K 9/137; Y02B 20/40
USPC ................. 315/294, 291, 312, 307, 297, 318; 362/249.02, 227
See application file for complete search history.

(56) References Cited

U.S. PATENT DOCUMENTS

| | | | |
|---|---|---|---|
| 7,386,421 | B2 | 6/2008 | Miki |
| 2009/0072945 | A1 | 3/2009 | Pan et al. |

(Continued)

FOREIGN PATENT DOCUMENTS

| | | | |
|---|---|---|---|
| DE | 10338535 | A1 | 8/2005 |
| JP | 2008251337 | A | 10/2008 |

(Continued)

*Primary Examiner* — Alexander H Taningco
*Assistant Examiner* — Christian L Garcia
(74) *Attorney, Agent, or Firm* — Meenakshy Chakravorty

(57) ABSTRACT

The present invention proposes a method, apparatus, controller and system for controlling illuminance. Specifically, the system comprises at least one light source, each of the at least one light source comprising a plurality of light modules and each of the plurality of light modules being adjustable independently; and a controller configured to control the illuminance of a target area in the lighting system. One or more light modules associated with the illuminance of the target area are selected from the at least one light source based on the position relationship between the at least one light source and the target area and a lighting distribution of each of the at least one light source. Then, at least one of the selected one or more light modules is adjusted to meet a certain requirement for the illuminance of the area. As a result, personalized lighting for an open area is effectively achieved.

14 Claims, 8 Drawing Sheets

(56) References Cited

U.S. PATENT DOCUMENTS

| | | | | |
|---|---|---|---|---|
| 2009/0085500 | A1 | 4/2009 | Zampini, II et al. | |
| 2010/0053580 | A1* | 3/2010 | Sekine et al. | 355/53 |
| 2010/0185339 | A1 | 7/2010 | Huizenga et al. | |
| 2010/0225929 | A1* | 9/2010 | Yeh et al. | 356/615 |

FOREIGN PATENT DOCUMENTS

| | | | |
|---|---|---|---|
| WO | 0216824 | A1 | 2/2002 |
| WO | 2010070517 | A1 | 6/2010 |
| WO | 2010079388 | A1 | 7/2010 |
| WO | 2011033444 | A1 | 3/2011 |

* cited by examiner

PERSONALIZED LIGHTING FOR OPEN AREA

CROSS-REFERENCE TO PRIOR APPLICATIONS

This application is the U.S. National Phase application under 35 U.S.C. §371 of International Application No. PCT/IB2012/057663, filed on Dec. 22, 2012, which claims the benefit of [e.g., U.S. Provisional Patent Application No. or European Patent Application No.] PCT/CN2011/085196, filed on Dec. 31, 2011. These applications are hereby incorporated by reference herein.

FIELD OF THE INVENTION

Embodiments of the present invention generally relate to the field of lighting, and more particularly, to a lighting system, and to a method, an apparatus, a controller, and a computer program product for controlling the illuminance of a target area in the lighting system.

BACKGROUND OF THE INVENTION

In an open area, such as an open-plan office or factory, there are usually several light sources arranged for general lighting. Conventionally, the light sources, such as luminaries, are fixed at predetermined positions on the ceiling. When a lighting system is built up with such light sources, the light sources are generally fixed and have little possibility to be changed.

The light for a target area, e.g., a small area, is usually coming from several luminaries; thus positions of the luminaires will affect the illuminance of the target area. Also, lighting distribution of the luminaires will have effect on the illuminance of the target area. Another factor which will further affect the illuminance of the target area is the output level of each of the luminaires.

In practice, in a case that a person, who works in an open area, wants to reduce the illuminance for his/her work place without reducing the illuminance for other places in the open area, it is difficult for a traditional lighting system to do so. In another case that the person wants to enhance the illuminance for his/her work place without affecting the illuminance for other places in the open area, the person can only use additional lamps to achieve the personalized lighting effect the way he wants to. Accordingly, it is inconvenient for a person in an open area to achieve personalized lighting.

In view of the foregoing, there is a need in the art for a solution for controlling the illuminance to achieve personalized lighting for an open area.

SUMMARY OF THE INVENTION

In order to enable personalized lighting for an open area and thus to solve the above problem, the present invention proposes a novel solution for controlling the illuminance of a target area in a lighting system.

In a first aspect, embodiments of the present invention provide a method of controlling the illuminance of a target area in a lighting system, wherein the lighting system comprises at least one light source and each of the at least one light source comprises a plurality of light modules; each of the plurality of light modules being adjustable independently. The method comprises: selecting at least one light module, which is associated with the illuminance of the target area, from the at least one light source based on the position relationship between the at least one light source and the target area and a lighting distribution of each of the at least one light source; and adjusting at least one of the selected at least one light module.

In a second aspect, embodiments of the present invention provide an apparatus for controlling the illuminance of a target area in a lighting system, wherein the lighting system comprises at least one light source and each of the at least one light source comprises a plurality of light modules; each of the plurality of light modules being adjustable independently. The apparatus comprises: a selector configured to select at least one light module, which is associated with the illuminance of the target area, from the at least one light source based on the position relationship between the at least one light source and the target area and a lighting distribution of each of the at least one light source; and an adjustor configured to adjust at least one of the selected at least one light module.

In a third aspect, embodiments of the present invention provide a controller for controlling the illuminance of a target area in a lighting system, wherein the lighting system comprises at least one light source and each of the at least one light source comprises a plurality of light modules; each of the plurality of light modules being adjustable independently. The controller comprises an apparatus according to the present invention.

In a fourth aspect, embodiments of the present invention provide a computer program product comprising a computer program that is tangibly embodied on a computer-readable medium. The computer program is configured to carry out the method according to the present invention.

In a fifth aspect, embodiments of the present invention provide a lighting system. The lighting system comprises: at least one light source, each of the at least one light source comprising a plurality of light modules and each of the plurality of light modules being adjustable independently; and a controller configured to control the illuminance of a target area in the lighting system, comprising an apparatus according to the present invention.

In accordance with the embodiments of the present invention, a lighting solution with only general lighting (like grille lighting in the ceiling) is disclosed, but makes it possible to enable people to tailor or personalize the lighting to their own working area and to their own preference and activities without disturbing the colleagues nearby. Accordingly, user experience and also the potential work performance may be significantly and effectively improved.

Other features and advantages of embodiments of the present invention will also be understood from the following description of specific exemplary embodiments when read in conjunction with the accompanying drawings, which illustrate, by way of example, the principles of the invention.

BRIEF DESCRIPTION OF THE DRAWINGS

Embodiments of the invention will be presented in the sense of examples and their advantages are explained in greater detail below, with reference to the accompanying drawings, wherein.

Throughout the figures, same or similar reference numbers indicate same or similar elements.

DETAILED DESCRIPTION OF EMBODIMENTS

Various embodiments of the present invention are described in detail with reference to the drawings. The flowcharts and block diagrams in the figures illustrate the apparatus, method, as well as the architecture, functions and operations executable by a computer program product according to the embodiments of the present invention. In this regard, each block in the flowcharts or block diagrams may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may actually be performed in parallel or inverse order, which depends on the related functions. It should also be noted that block diagrams and/or each block in the flowcharts and a combination of thereof may be implemented by a dedicated hardware-based system for performing specified functions/operations or by a combination of dedicated hardware and computer instructions.

In general, embodiments of the present invention provide a lighting system and provide a method, an apparatus, a controller, and a computer program product for controlling the illuminance of a target area in the lighting system. Now some exemplary embodiments of the present invention will be described with reference to the figures.

Figure 1:
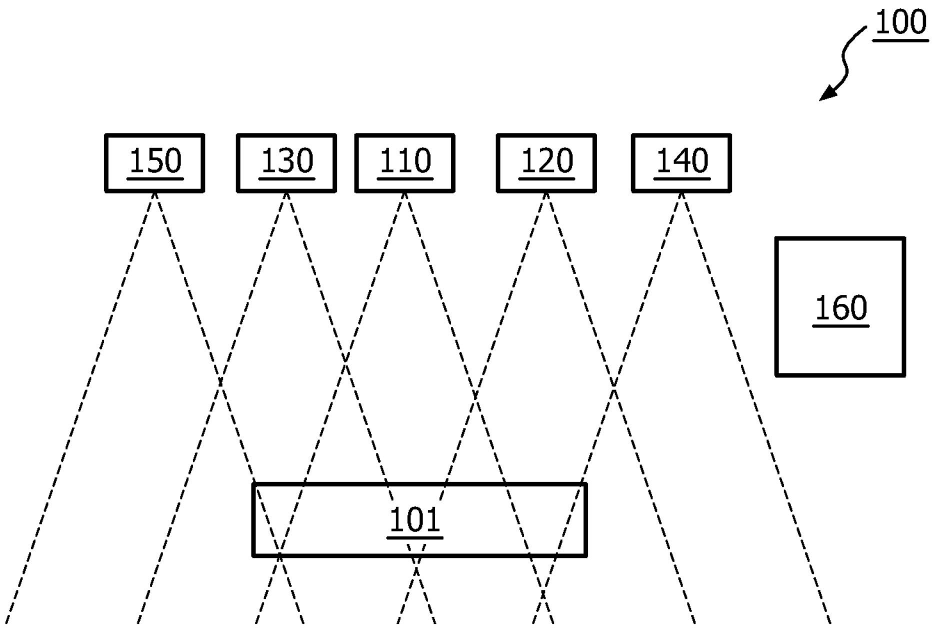
FIG. 1 is a high-level block diagram illustrating a lighting system in accordance with an exemplary embodiment of the present invention.

Reference is first made to FIG. 1, where a high-level block diagram illustrating a lighting system 100 in accordance with an exemplary embodiment of the present invention is shown.

According to embodiments of the present invention, the lighting system may comprise at least one light source and a controller for controlling them. As shown in FIG. 1, the lighting system 100 comprises five light sources 110, 120, 130, 140 and 150 (e.g. 5 luminaires), as well as a controller 160. In this lighting system 100, each of the light sources may comprise a plurality of light modules (not shown; and for example 10 light modules) and each of the plurality of light modules may be adjustable independently.

In some embodiments, an output level of each light module in a light source may be adjustable independently from other light modules. Accordingly, when the output level of a light module is adjusted, the output levels of other light modules would not be affected. As would be appreciated by those skilled in the art, the lighting direction or other suitable factor of a light module in a light source may also be adjustable independently.

In some embodiments, light emitting diodes (LEDs) may serve as the light emitting elements in a light module. Alternatively or additionally, organic light emitting diodes (OLEDs) or fluorescents may be used in connection with the embodiments of the present invention.

In some embodiments, light sources which contribute to the illuminance of a target area are considered as being associated with the target area. With respect to the embodiment shown in FIG. 1, the light emitted by the light sources 110, 120, 130, 140 and 150 will illuminate a target area 101, which may be predetermined in an open area where the lighting system 100 is built up. As can be seen, light sources 110, 120, 130, 140 and 150 are associated with the illuminance of the target area.

It is noted that though five light sources are shown in FIG. 1, there could be one or more light sources, that is, the number of light sources may be less or more than five and not limited to five. It is also noted that a target area in the present invention may be a work place, a study place, a target object, or any other place used by a person.

The controller 160 may be configured to control the illuminance of the target area 101 in the lighting system 100. According to embodiments of the present invention, the controller 160 may comprise an apparatus (not shown) for controlling the illuminance of a target area in a lighting system. According to embodiments of the present invention, the apparatus may comprise a selector and an adjustor. The selector may select at least one light module, which is associated with the illuminance of the place, from the at least one light source that is based on the position relationship between the at least one light source and the target area and a lighting distribution of each of the at least one light source; and the adjustor may adjust at least one of the selected at least one light module. Details of the apparatus will be described with respect to FIG. 12 as below.

It is noted that the controller according to the present invention, e.g. the controller 160, may be configured to implement functionalities as described with reference to the method and apparatus according to the present invention. Therefore, the features discussed with respect to the method according to the present invention apply to the corresponding components in the controller 160. It is further noted that the controller 160 may be embodied in hardware, software, firmware, and/or any combination thereof. For example, the controller 160 may be implemented by using a circuit implemented in hardware, a processor, a computer or a server with computer programs configured to carry out the method according to the present invention, or any other appropriate device implemented in hardware or software. Those skilled in the art will appreciate that the aforesaid examples are only for illustration not limitation.

In some embodiment of the present disclosure, the controller according to the present invention, e.g. the controller 160, may comprise at least one processor. The at least one processor suitable for use with embodiments of the present disclosure may include, by way of example, both general and special-purpose processors that are already known or will be developed in the future. The controller 160 may further comprise at least one memory. The at least one memory may include, for example, semiconductor memory devices, e.g. RAM, ROM, EPROM, EEPROM, and flash memory devices. The at least one memory may be used to store programs of computer executable instructions. The program can be written in any high-level and/or low-level compliable or interpretable programming languages. In accordance with embodiments, the computer executable instructions may be configured, with the at least one processor, to cause the controller 160 to at least perform the methods according to the present invention.

In some embodiment of the present disclosure, the controller according to the present invention may perform wireless control or wired control on the light source(s) in the lighting system. As would be appreciated by those skilled in the art, wireless control may adopt a number of wireless technologies including, for example, WiFi, Low-Power WiFi, Bluetooth, EnOcean, Z-Wave and similar technologies, which typically permit short range communication.

Figure 2:
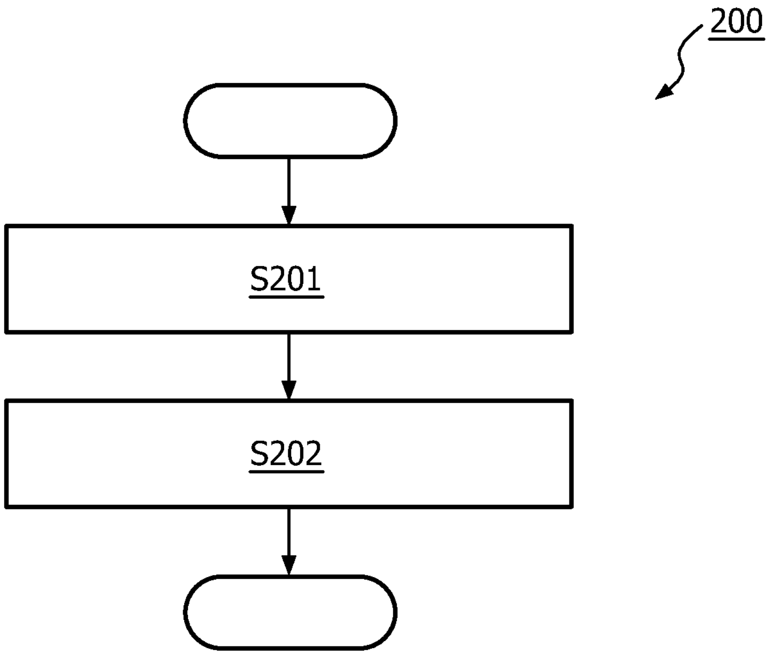
FIG. 2 is a flowchart illustrating a method of controlling the illuminance of a target area in a lighting system in accordance with an exemplary embodiment of the present invention.

Reference is now made to FIG. 2, where a flowchart illustrating a method 200 of controlling the illuminance of a target area in a lighting system in accordance with an exemplary embodiment of the present invention is shown. The lighting system may be the lighting system 100 as illustrated in FIG. 1, which comprises at least one light source, each of the at least one light source comprises a plurality of light modules, and each of the plurality of light modules is adjustable independently.

At step S201, at least one light module, which is associated with the illuminance of a target area, is selected from the at least one light source based on the position relationship between the at least one light source and the target area and a lighting distribution of each of the at least one light source.

According to embodiments of the present invention, the position relationship between the at least one light source and the target area generally represents the relationship between the position of the at least one light source and the position of the target area. Specifically, the position relationship may comprise position information on the at least one light source and on the target area, e.g. three-dimensional coordinate information, which comprises the coordinate of the at least one light source and the coordinate of the target area. The position relationship may also comprise direction information on the at least one light source and on the target area, e.g. one or more directional angles which represent the angles between the at least one light source and on the target area.

According to embodiments of the present invention, the position relationship may be stored in advance in a memory. In some embodiments, the position relationship may include association between the target area and one or more light sources. In some embodiments, the position relationship may include association between the target area and one or more light modules in the light sources. By looking up in the stored position relationship, at least one light module which is associated with the target area may be determined.

The position relationship may be obtained based on positions of the target area and the at least one light source. Specifically, in an exemplary embodiment, at least one relative direction of the target area may be calculated from the at least one light source, and the position relationship between the at least one light source and the target area may be obtained based on the at least one relative direction.

According to embodiments of the present invention, the lighting distribution refers to the light intensity of a light source in respective directions in a space. The lighting distribution of a light source may be in a form of a triangle, a droplet, a sector, or any other suitable shape. The lighting distribution may comprise a plurality of parts (for example N parts, where N≥2), and each part may correspond to one of the plurality of light modules in a light source.

Figure 4:
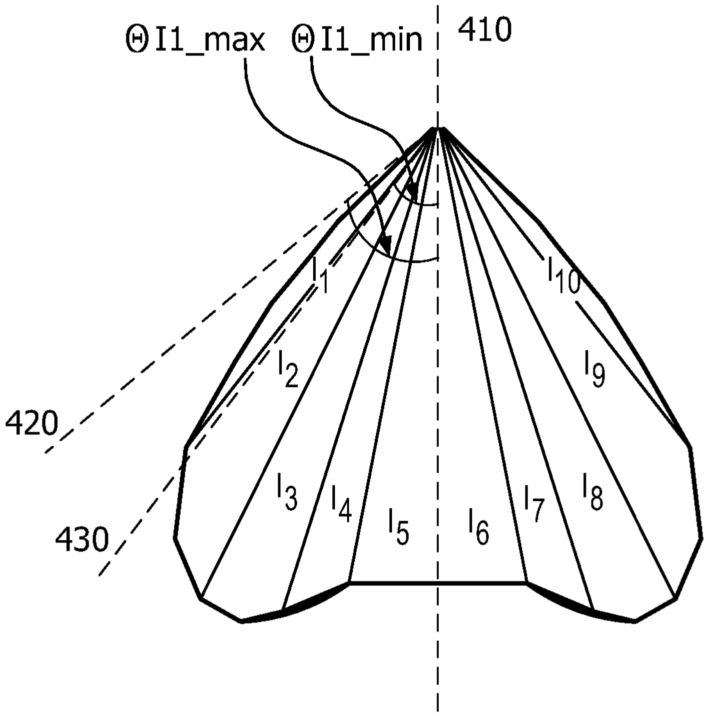
FIG. 4 is a schematic diagram illustrating an example of lighting distribution of a light source in accordance with an exemplary embodiment of the present invention.

Reference is now made to FIG. 4, where a schematic diagram illustrating an example of lighting distribution of a light source in accordance with an exemplary embodiment of the present invention is shown. It can be seen that the illustrated lighting distribution is in a droplet-like form. Only for purpose of illustration, the light source exemplarily comprises 10 light modules. As shown in FIG. 4, the lighting distribution comprises 10 parts (that is, N=10), which are denoted as $I_1, I_2, I_3, \ldots, I_8, I_9, I_{10}$ respectively. In an embodiment of the present invention, a part $I_i$ (i=1, 2, 3, . . . , N) may be expressed as:

$$I^i = I_{i\text{-}0} \cdot F_i(\theta), \text{ where } i=1,2,3, \ldots, N. \tag{1}$$

Here, $I_{i\text{-}0}$ may be used to describe the output level of each light module of a light source; θ is a parameter to describe the direction of work place from each light module of a light source. $F_i(\theta)$ is a function of θ and may be expressed in various forms. For example, for Lambertian lighting distribution, $F_i(\theta)$ may be in the form of $F_i(\theta)=\cos(\theta)$. For another example, for some type droplet-shape lighting distribution, $F_i(\theta)=\cos^n(\theta)$, where n=2, 3, 4 . . . etc. For yet another example, $F_i(\theta)$ may also be expressed as some other numerical function.

In view of the foregoing, the lighting distribution of a light source (denoted as I(θ)) may be expressed as:

$$\begin{aligned} I(\theta) &= [I_1, I_2, I_3, \ldots, I_8, I_9, I_{10}] \\ &= [I_{1-0} \cdot F_1(\theta), I_{2-0} \cdot F_2(\theta), \ldots, I_{9-0} \cdot F_9(\theta), I_{10-0} \cdot F_{10}(\theta)] \end{aligned} \tag{2}$$

According to embodiments of the present invention, one or more light modules may be selected from the at least one light source in various ways. Specifically, in some exemplary embodiments, the one or more light sources may be selected by means of: obtaining, from the position relationship, a relative direction of the target area from a light source; obtaining, from the lighting distribution of the light source, lighting directions of a plurality of light modules emitting from the light source; comparing the relative direction with the lighting directions; and selecting one light module from the plurality of light modules of the light source based on the comparison results. In some other exemplary embodiments, the one or more light modules which are associated with the illuminance of a target area may be determined in advance based on the position relationship between the at least one light source and the target area and a lighting distribution of each of the at least one light source and stored in a memory or storage device, including, for example, semiconductor memory devices, e.g., RAM, ROM, EPROM, EEPROM, and flash memory devices. In this way, the one or more light modules, which are associated with the illuminance of a target area, may be selected from the at least one light source by looking up in the memory or storage device.

At step S202, at least one of the selected at least one light module is adjusted.

According to embodiments of the present invention, the selected at least one light module may be adjusted in various ways. For example, the selected at least one light module may be adjusted dependently or independently from each other. For another example, a subset of the selected at least one light module may be adjusted.

In an exemplary embodiment, lighting requirement for the target area may be obtained and the selected at least one light module may be adjusted in proportion or independently to meet the lighting requirement.

Alternatively, in an exemplary embodiment, lighting requirement for the target area may be obtained and a portion or all of the selected at least one light module may be adjusted to meet the lighting requirement.

According to embodiments of the present invention, the light module may comprise at least one light emitting element. A light emitting element may be a LED, an OLED, a fluorescent or any other suitable element.

Figure 3:
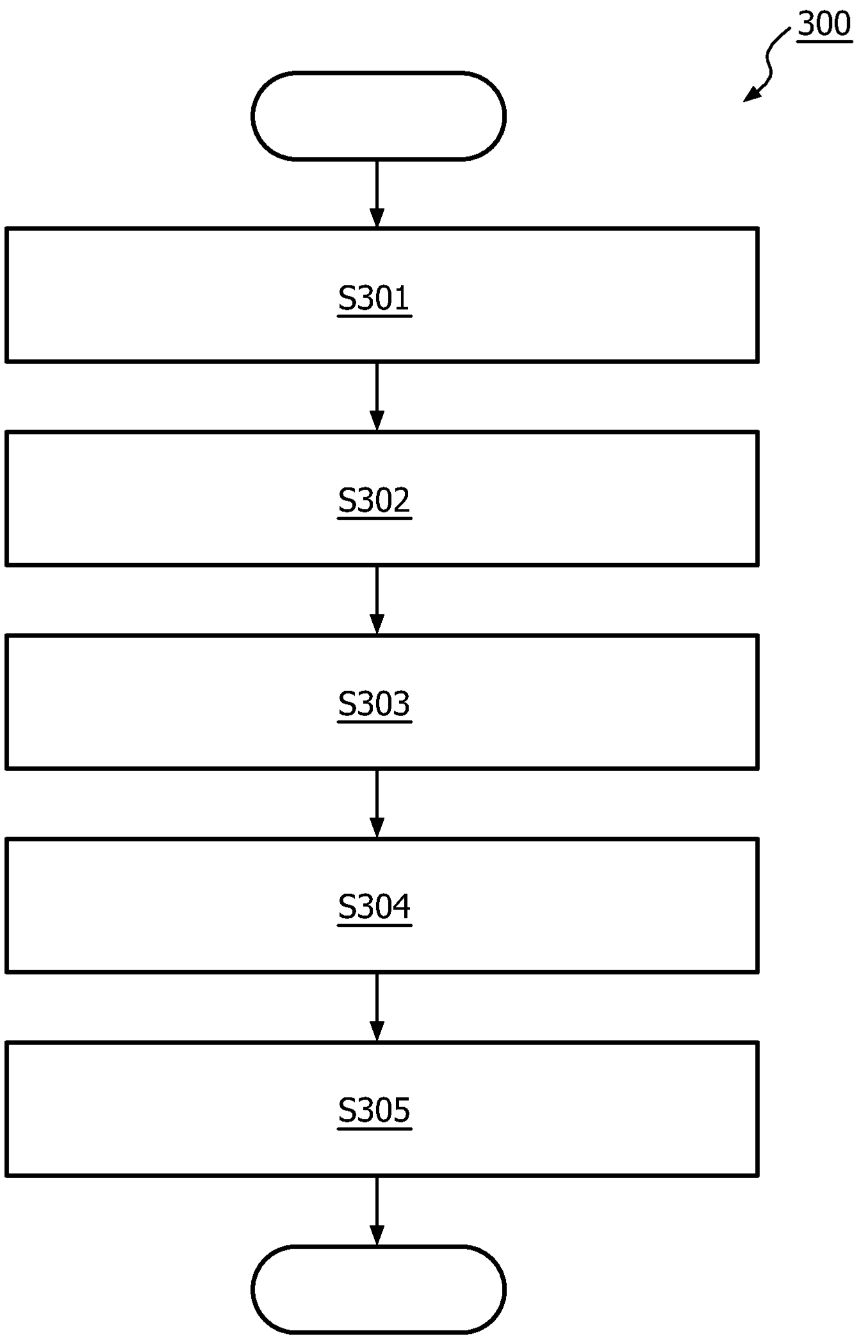
FIG. 3 is a flowchart illustrating a method of controlling the illuminance of a target area in a lighting system in accordance with an exemplary embodiment of the present invention.

Reference is now made to FIG. 3, where a flowchart illustrating a method 300 of controlling the illuminance of a target area in a lighting system in accordance with an exemplary embodiment of the present invention is shown. The lighting system may be the lighting system 100 as illustrated in FIG. 1, which comprises at least one light source, each of the at least one light source comprises a plurality of light modules, and each of the plurality of light modules is adjustable independently.

At step S301, lighting requirement for the target area is obtained.

In some embodiments, the lighting requirement may be predefined or inputted by a user according to his/her preference or experience. There are several ways of obtaining the lighting requirement. For example, in the case that the lighting requirement is predefined, the lighting requirement may be pre-stored in advance in a memory, which may be, for example, semiconductor memory devices (e.g., RAM, ROM, EPROM, EEPROM, etc.), flash memory devices, and so on; and the lighting requirement may be obtained when the illuminance of a target area is to be adjusted. For another example, in the case that the lighting requirement is inputted by a user in real time, the lighting requirement may be received from an interface between the user and the lighting system, and the interface may be a graphic user interface (GUI), a remote controller, a portable device, a computer or any other suitable device available for those skilled in the art to enter their requirement for the illuminance of the place.

At step S302, a relative direction of the target area from a light source is obtained from the position relationship.

Figure 5:
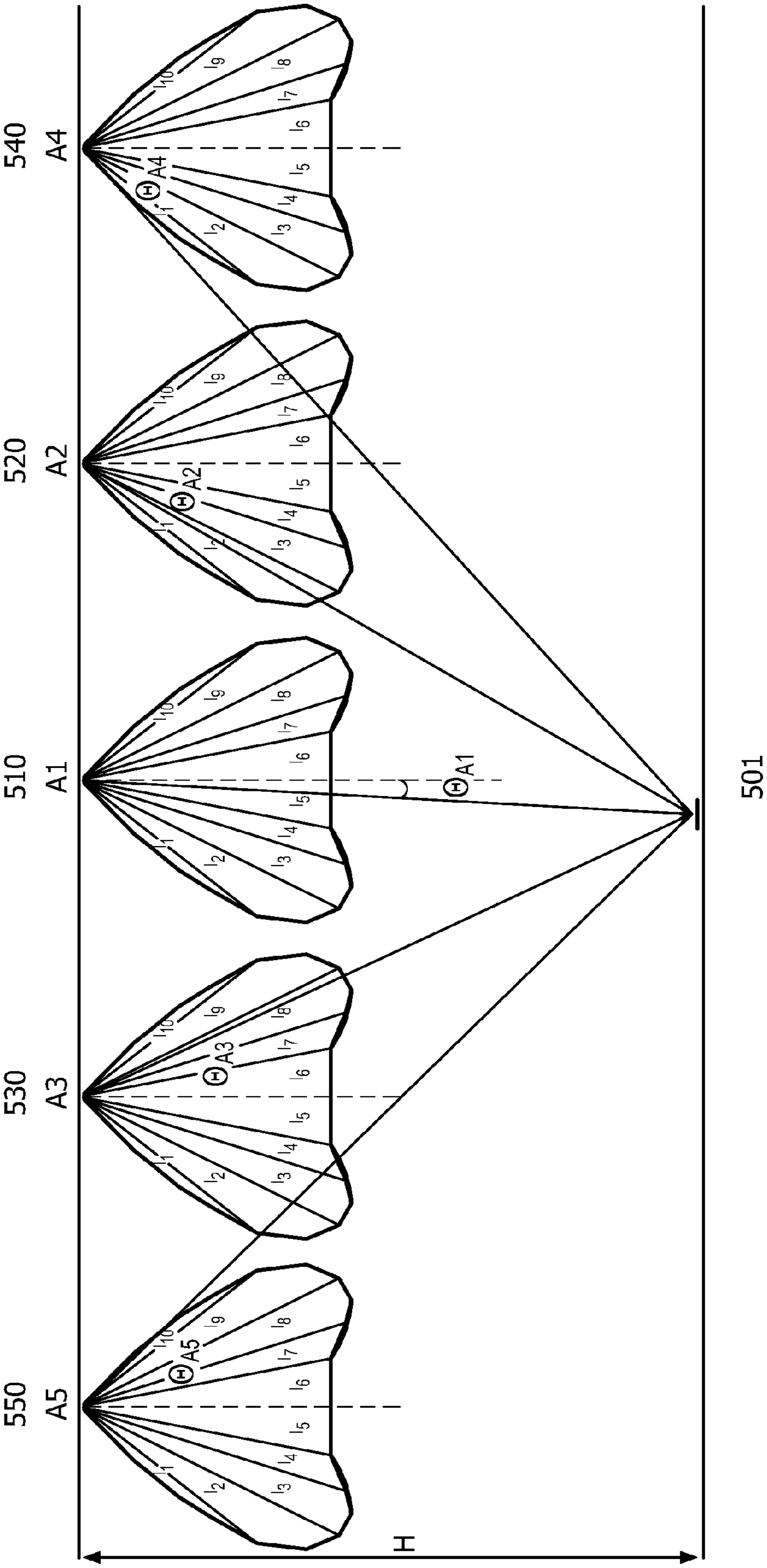
FIG. 5 is a schematic diagram illustrating the controlling of illuminance of a target area in a lighting system in accordance with an exemplary embodiment of the present invention.

According to embodiments of the present invention, a relative direction is a parameter to describe the direction of work place from a light source. Only for the purpose of illustration, it is assumed that the lighting system comprises 5 light sources, and each light source comprises 10 light modules, as illustrated in FIG. 5. Reference is now made to FIG. 5, where a schematic diagram illustrating the controlling of illuminance of a target area 501 in a lighting system in accordance with an exemplary embodiment of the present invention is shown, and where the lighting system comprises 5 light sources 510, 520, 530, 540 and 550, denoted as A1, A2, A3, A4 and A5 for brevity purposes. As shown, a relative direction of the target area from a light source is exemplarily illustrated as $\theta_{Ai}$, where i=1, 2, . . . , 5. Specifically, assuming a first line is from the $i^{th}$ light source to the area, and a second line is from the $i^{th}$ light source to the ground and perpendicular to the ground, then the $\theta_{Ai}$ may be calculated as the angle between the first line and the second line. Accordingly, $\theta_{A1}$, $\theta_{A2}$, $\theta_{A3}$, $\theta_{A4}$ and $\theta_{A5}$ representing the relative directions of the target area from the light sources A1, A2, A3, A4 and A5, may be obtained respectively.

According to embodiments of the present invention, the position relationship may be obtained in several ways. In some embodiments, the position relationship may be obtained by first calculating at least one relative direction of the target area from the at least one light source, and then obtaining the position relationship based on the at least one relative direction. According to an embodiment of the present invention, since the positions of the light sources and the target area are not easily changed, the position relationship between a light source and the target area may be obtained in advance and stored in a memory or storage device, for future use. According to another embodiment of the present invention, the position relationship may be calculated in real time in the process of the method according to the present invention.

At step S303, lighting directions of a plurality of light modules emitting from the light source are obtained from lighting distribution of the light source.

It is noted that during the step S302, any of the relative directions $\theta_{A1}$, $\theta_{A2}$, $\theta_{A3}$, $\theta_{A4}$ and $\theta_{A5}$ may be obtained from the position relationship. Only for the purpose of illustration, it is assumed that at step S302, the relative direction, e.g. ($\theta_{A4}$ of the target area from light source 540, i.e. A4, is obtained from the position relationship. Thus, at step S303, lighting directions of a plurality of light modules emitting from light source 540 may be obtained from the lighting distribution of the light source 540.

According to embodiments of the present invention, the lighting distribution of the light source 540 may be in a droplet-like form as shown in FIG. 4. Similarly, the lighting distribution of the light source 540 may also comprise 10 parts, denoted as $I_1$, $I_2$, $I_3$, $I_8$, $I_9$, $I_{10}$ respectively, wherein each part corresponds to each light module in the light source 510. In some embodiments, each light module emits light and accordingly has a lighting scope, which corresponds to a range of angle. Thus, the lighting directions of all light modules in the light source 540 may be obtained.

A lighting direction of a light module emitting from a light source is, for example, the range of angle. The maximum in the range of angle may be the angle (denoted as $\theta_{I1\_max}$ in FIG. 4) between the light 420 (which is the furthest light emitted from the first light module corresponding to the part $I_1$) and the perpendicular line 410 of the light source. The minimum in the range of angle may be the angle (denoted as $\theta_{I1\_min}$ in FIG. 4) between the light 430 (which is the nearest light emitted from the first light module corresponding to the part I1) and the central perpendicular line 410 of the light source.

At step S304, the relative direction is compared with the lighting directions.

According to the assumption made at step S304, the relative direction, e.g. $\theta_{A4}$ of the target area from light source 540, may be compared with respective lighting directions of 10 light modules emitting from the light source 540. Based on this comparison, it is easy to determine the relative direction, which is most relative to the lighting direction of the light module in the light source 540.

For example, the relative direction $\theta_{A4}$ may be compared with the lighting direction of the first light module (corresponding to part $I_1$) in the light source 540, with the lighting direction of the second light module (corresponding to part $I_2$) in the light source 540, . . . , with the lighting direction of the tenth light module (corresponding to part $I_{10}$) in the light source 540. In response to the relative direction, ($\theta_{A4}$ falls into the range of $\theta_{I1\_max}$ to $\theta_{I1\_min}$; it can be determined that the first light module which corresponds to the part $I_1$ contributes to the illuminance of the place. In other words, the relative direction $\theta_{A4}$ is most relative to the part $I_1$.

At step S305, one light module is selected from the plurality of light modules of the light source based on the comparison results.

For example, as shown in FIG. 5, the relative direction, e.g. $\theta_{A4}$ is most relative to the part $I_1$, thus the light module, which corresponds to the part $I_1$, in the light source 540 may be selected from the plurality of light modules of the light source.

It is noted that in steps S302 to S305, the light source 540 is taken, for example, as the light source recited in these steps only for the purpose of illustration; those skilled in the art will readily understand that any one of the light sources 510, 520, 530, 540 and 550 is applicable to the process of steps S302 to S305. Thus, by performing the steps S302 to S305, a light module (for example, corresponding to part $I_5$) may be selected from the light source 510, a light module (for example, corresponding to part $I_2$) may be selected from the light source 520, a light module (for example, corresponding to part $I_9$) may be selected from the light source 530 and a light module (for example, corresponding to part $I_{10}$) may be selected from the light source 550.

At step S306, at least one of the selected light modules is adjusted in proportion or independently to meet a lighting requirement.

According to embodiments of the present invention, the lighting requirement for the target area may define the desired illuminance of the area. The desired illuminance may be obtained from the lighting requirement, and then the output level of at least one of the selected light modules may be adjusted, based on the relationship between the output level and the illuminance, to meet the lighting requirement. The output level of a light module may be adjusted by various ways, e.g. by increasing or reducing the voltage or the current of a light module, or by any other means known in the art. In some embodiments, the relationship between the output level and the illuminance may have a different form, depending on the concrete scenario of the lighting system. For example, with respect to the lighting system as illustrated in FIG. 5, for the target area 501, five light modules (corresponding to $I_5$ in A1, $I_2$ in A2, $I_9$ in A3, $I_1$ in A4 and $I_{10}$ in A5) are selected from light sources A1, A2, A3, A4 and A5, the relationship between the output level and the illuminance (denoted as "E") may be defined as follows:

$$E = I_{A5-10}(\theta_{A5})\cdot\frac{(\cos\theta_{A5})^3}{H^2} + I_{A3-9}(\theta_{A3})\cdot\frac{(\cos\theta_{A3})^3}{H^2} + I_{A1-5}(\theta_{A1})\cdot\frac{(\cos\theta_{A1})^3}{H^2} + I_{A2-2}(\theta_{A2})\cdot\frac{(\cos\theta_{A2})^3}{H^2} + I_{A4-1}(\theta_{A4})\cdot\frac{(\cos\theta_{A4})^3}{H^2} \quad (3)$$

where H indicates the height of each light source with respect to the ground; $I_{A1-5}(\theta_{A1})$ indicates the output level of part $I_5$ in the lighting distribution of the light source A1; $I_{A2-2}(\theta_{A2})$ indicates the output level of part $I_2$ in the lighting distribution of the light source A2; $I_{A3-9}(\theta_{A3})$ indicates the output level of part $I_9$ in the lighting distribution of the light source A3; $I_{A4-1}(\theta_{A4})$ indicates the output level of part $I_1$ in the lighting distribution of the light source A4; $I_{A5-10}(\theta_{A5})$ indicates the output level of part $I_{10}$ in the lighting distribution of the light source A5; and $\theta_{A1}$, $\theta_{A2}$, $\theta_{A3}$, $\theta_{A4}$ and $\theta_{A5}$ indicate the relative directions of the target area from the light sources A1, A2, A3, A4 and A5 respectively.

As can be appreciated by those skilled in the art, there may be many other forms for the relationship between the output level and the illuminance, and the above equation (3) is shown for purpose of illustration, not as limitation.

In some embodiments of the present invention, the at least one light module is adjusted in proportion to meet the lighting requirement. Specifically, for example, the output levels of the five light modules (corresponding to $I_5$ in A1, $I_2$ in A2, $I_9$ in A3, $I_1$ in A4 and $I_{10}$ in A5) may be multiplied with a parameter, wherein the parameter is less than 1 when there is a need to reduce the illuminance of the place, and the parameter exceeds 1 when there is a need to increase the illuminance of the place. As would be appreciated by those skilled in the art, the concrete value of the parameter depends on several factors, such as the form of the relationship between the output level and the illuminance, and the parameter may be worked out with respect to a concrete scenario.

In alternative embodiments of the present invention, the at least one light module is adjusted independently to meet the lighting requirement. Specifically, the output level(s) of one or more of the five light modules (corresponding to $I_5$ in A1, $I_2$ in A2, $I_9$ in A3, $I_1$ in A4 and $I_{10}$ in A5) may be reduced or increased when there is a need to reduce or increase the illuminance of the place. For example, only the output level of the light module corresponding to $I_5$ in A1 is adjusted and the remaining four light modules (corresponding to $I_2$ in A2, $I_9$ in A3, $I_1$ in A4 and $I_{10}$ in A5) are unchanged. For another example, only the output levels of the light module corresponding to $I_5$ in A1 and the light module corresponding to $I_9$ in A3 are adjusted and the remaining three light modules (corresponding to $I_2$ in A2, $I_1$ in A4 and $I_{10}$ in A5) are unchanged. Any one or more of the selected light modules may be adjusted, and the above examples are only for illustration.

Those skilled in the art would appreciated that at least one light module may be adjusted in various ways to meet the lighting requirement; for example, a portion of (or all of) the light module(s) may be adjusted according to the lighting requirement. Thus, the above embodiments are illustrative and exemplary, but not for purpose of limitation.

Figure 6:
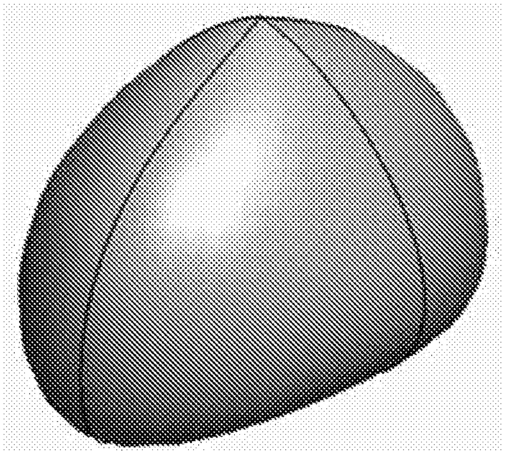
FIG. 6 is a schematic diagram illustrating an example in three dimensions of lighting distribution of a light source in accordance with an exemplary embodiment of the present invention.

Reference is now made to FIG. 6, where a schematic diagram illustrating an example in three dimensions of lighting distribution of a light source in accordance with an exemplary embodiment of the present invention is shown. It can be seen from FIG. 6 that the lighting distribution of a light source may be in a form of a droplet in three dimensions (3D).

Figure 7:
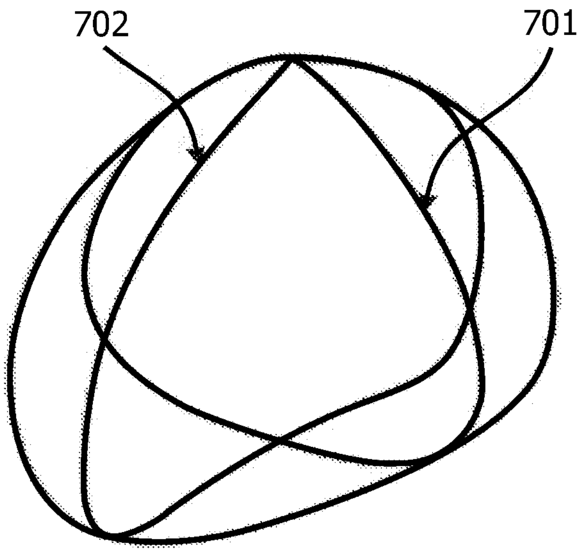
FIG. 7 is a schematic diagram illustrating a front view and a side view of a lighting distribution in accordance with an exemplary embodiment of the present invention.

Reference is now made to FIG. 7, where a schematic diagram illustrating a front view and a side view of a lighting distribution in accordance with an exemplary embodiment of the present invention is shown. Specifically, the front view is denoted as 701 and the side view is denoted as 702, as shown in FIG. 7.

Figure 8:
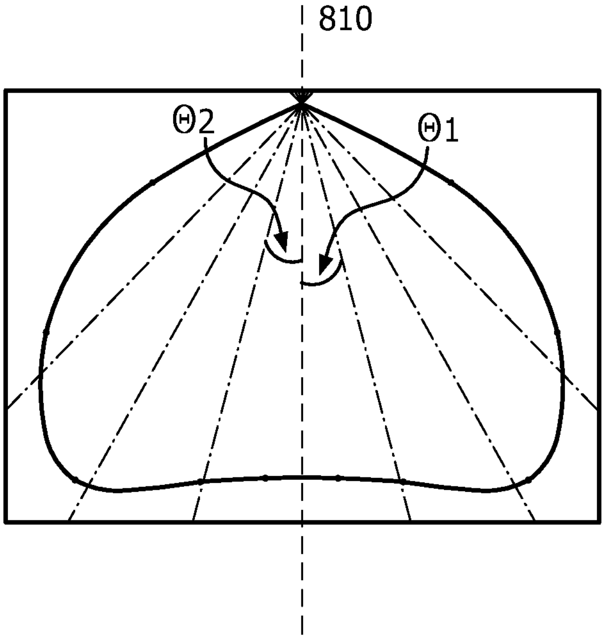
FIG. 8 is a schematic diagram illustrating a cross section of a lighting distribution in the front view in accordance with an exemplary embodiment of the present invention.

Reference is now made to FIG. 8, where a schematic diagram illustrating a cross section of a lighting distribution in the front view in accordance with an exemplary embodiment of the present invention is shown.

According to embodiments of the present invention, the lighting distribution in the front view may be divided in several parts (for example, which may be similar as $I_1$, $I_2$, $I_3$, . . . , $I_8$, $I_9$, $I_{10}$, as shown in FIG. 4), and each part corresponds to each light module in a light source. In some embodiments, a light source comprises multiple light modules, and a light module emits light and accordingly has a lighting scope, which corresponds to a range of angle θ. Thus, the lighting distribution in the front view may be uniformly divided into several parts (for example, 8 parts), each part corresponding to a light module in the light source. The angle θ may be illustrated as $\theta_1, \theta_2, \ldots \theta_8$. For simple representation, only $\theta_1$ and $\theta_2$ are shown in FIG. 8, where, for example, $0° < \theta_1 \leq 15°$, and $-15° < \theta_2 \geq 0°$; and those skilled in the art will readily understand the range of other angles. It is noted that in this example, $\theta_2$ is symmetrical to $\theta_1$ with respect to the central perpendicular line 810 of the light source, thus the value of $\theta_2$ is negative.

Figure 9:
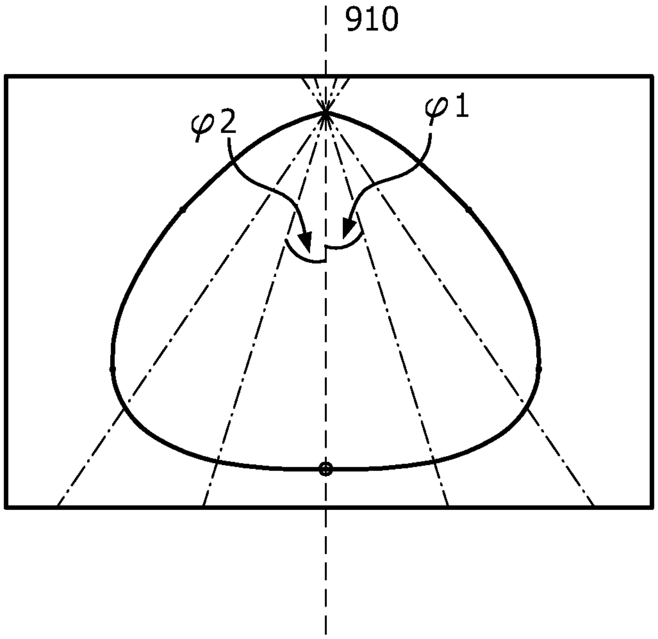
FIG. 9 is a schematic diagram illustrating a cross section of a lighting distribution in the side view in accordance with an exemplary embodiment of the present invention.

Reference is now made to FIG. 9, where a schematic diagram illustrating a cross section of a lighting distribution in the side view, in accordance with an exemplary embodiment of the present invention, is shown.

Similar to the embodiment shown in FIG. 8, a light module emits light and accordingly has a lighting scope, which corresponds to a range of angle ϕ, and the lighting distribution in the side view may be uniformly divided into several parts (for example, 6 parts), each part corresponding to a light module in the light source. The angle co may be illustrated as $\phi_1, \phi_2, \ldots \phi_6$. For simple representation, only $\phi_1$ and $\phi_2$ are shown in FIG. 9, where, for example, $0° < \phi_1 \leq 20°$, and $-20° < \phi_2 \leq 0°$; and those skilled in the art will readily understand the range of other angles. It is noted that, in this example, $\phi_2$ is symmetrical to $\phi_1$ with respect to the central perpendicular line 910 of the light source; thus the value of $\phi_2$ is negative.

According to embodiments of the present invention, ? [something is missing over here]

In view of the foregoing, if a light source comprises N light modules, in three dimensions, the part (denoted as I(θ, ϕ)) corresponding to each light module in the lighting distribution may be expressed as:

$$I_i(\theta,\phi)=I_i \cdot F_i(\theta,\phi), \text{ where } i=1,2,3, \ldots, N. \qquad (4)$$

Accordingly, the lighting distribution of a light source (denoted as I(θ, ϕ) may be expressed as:

$$I(\theta,\phi)=[I_1(\theta,\phi), I_2(\theta,\phi), \ldots, I_N(\theta,\phi)] \qquad (5)$$

Figure 10:
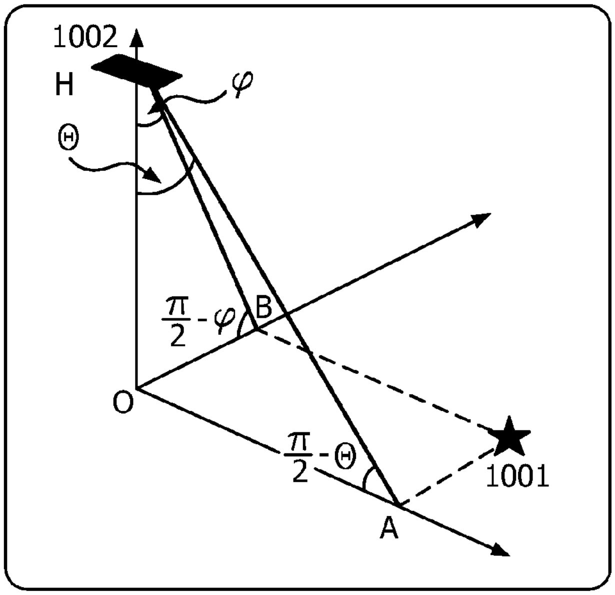
FIG. 10 is a schematic diagram illustrating the controlling of illuminance of a target area in accordance with an exemplary embodiment of the present invention.

Reference is now made to FIG. 10, where a schematic diagram illustrating the controlling of the illuminance of a target area in accordance with an exemplary embodiment of the present invention is shown.

As seen from FIG. 10, the target area is denoted as 1001 and a light source is denoted as 1002. Now some descriptions are given with respect to the selection of a light module, which is associated with the illuminance of the target area 1001, from the light source 1002 based on the position relationship between the light source and the target area 1001 and the lighting distribution of the light source 1002.

Figure 11:
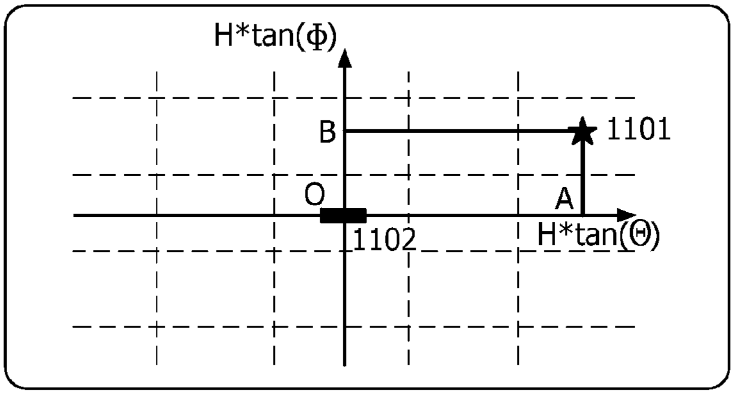
FIG. 11 is a schematic diagram illustrating the position relationship between a target area and a light source in accordance with an exemplary embodiment of the present invention.

For those skilled in the art, it is readily to understand how to calculate the position relationship between the target area and the light source. For example, in a 3D space, the position relationship between a target area 1001 and a light source 1002 may comprise a distance between a point O and a point A on the ground (also called as "distance OA"), a distance between a point O and a point B on the ground (also called as "distance OB"). An exemplary embodiment for calculating the distances may refer to FIG. 11, where a schematic diagram illustrating the position relationship between a target area 1101 and a light source 1102 in accordance with an exemplary embodiment of the present invention is shown. The distance OA may be calculated by H·tan(θ), and the distance OB may be calculated by H·tan(ϕ).

In view of the foregoing, the illuminance (denoted as "E") of the target area may be calculated as follows:

$$E=I(\theta,\phi)\cdot\cos^3(\arctan\sqrt{\tan^2(\theta)+\tan^2(\phi)})/H^2 \qquad (6)$$

where H indicates the height of the light source 1002 with respect to the ground 1003.

Figure 12:
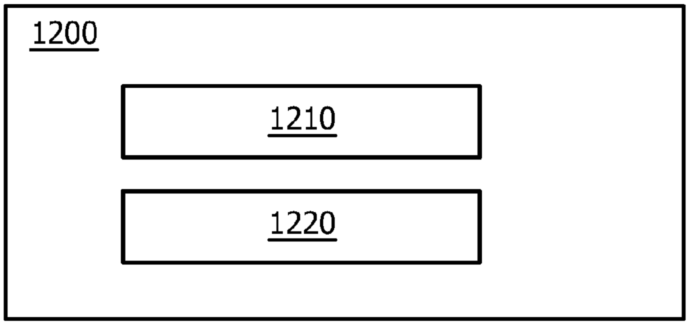
FIG. 12 is a schematic diagram illustrating an apparatus for controlling illuminance of a target area in a lighting system in accordance with an exemplary embodiment of the present invention.

Reference is now made to FIG. 12, where a schematic diagram illustrating an apparatus 1200 for controlling the illuminance of a target area in a lighting system in accordance with an exemplary embodiment of the present invention is shown. The lighting system may be the lighting system 100 as illustrated in FIG. 1, which comprises at least one light source, each of the at least one light source comprises a plurality of light modules, and each of the plurality of light modules is adjustable independently.

The apparatus 1200 may comprise two components: a selector 1210 and an adjustor 1220. According to embodiments of the present invention, the selector 1210 may be configured to select at least one light module, which is associated with the illuminance of the area, from the at least one light source based on the position relationship between the at least one light source and the target area and a lighting distribution of each of the at least one light source; and the adjustor 1220 may be configured to adjust at least one of the selected at least one light module.

According to embodiments of the present invention, the selector 1210 may comprise: a calculating unit configured to calculate at least one relative direction of the target area from the at least one light source; and a first obtaining unit configured to obtain the position relationship between the at least one light source and the target area based on the at least one relative direction.

According to embodiments of the present invention, the selector 1210 may comprise: a second obtaining unit configured to obtain, from the position relationship, a relative direction of the target area from a light source; a third obtaining unit configured to obtain, from the lighting distribution of the light source, lighting directions of a plurality of light modules emitting from the light source; a comparing unit configured to compare the relative direction with the lighting directions; and a selecting unit configured to select one light module from the plurality of light modules of the light source based on the comparison results.

According to embodiments of the present invention, the adjustor 1220 may comprise: a first adjusting unit configured to adjust in proportion or independently the at least one light module to meet a lighting requirement.

According to embodiments of the present invention, the lighting distribution of a light source may be in a form of a triangle, a droplet, or a sector.

According to embodiments of the present invention, a light module may comprise at least one light emitting element. According to embodiments of the present invention, a light emitting element may be a LED, an OLED or a fluorescent.

It is noted that the apparatus 1200 may be configured to implement functionalities, as described with reference to FIGS. 2 and 3. Therefore, the features discussed with respect to methods of the present invention, such as methods 200 and 300, apply to the corresponding components of the apparatus 1200. It is further noted that the components of the apparatus 1200 may be embodied in hardware, software, firmware, and/or any combination thereof. For example, the components of the apparatus 1200 may be respectively implemented by a circuit, a processor or any other appropriate device. Those skilled in the art will appreciate that the aforesaid examples are only for the purpose of illustration, not as limitation.

In some embodiments of the present disclosure, the apparatus 1200 comprises at least one processor. The at least one processor suitable for use with embodiments of the present disclosure may include, by way of example, both general and special-purpose processors that are already known or will be developed in the future. The apparatus 1200 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 1200 to at least perform according to methods of the present invention, such as methods 200 or 300 as discussed above.

Figure 13:
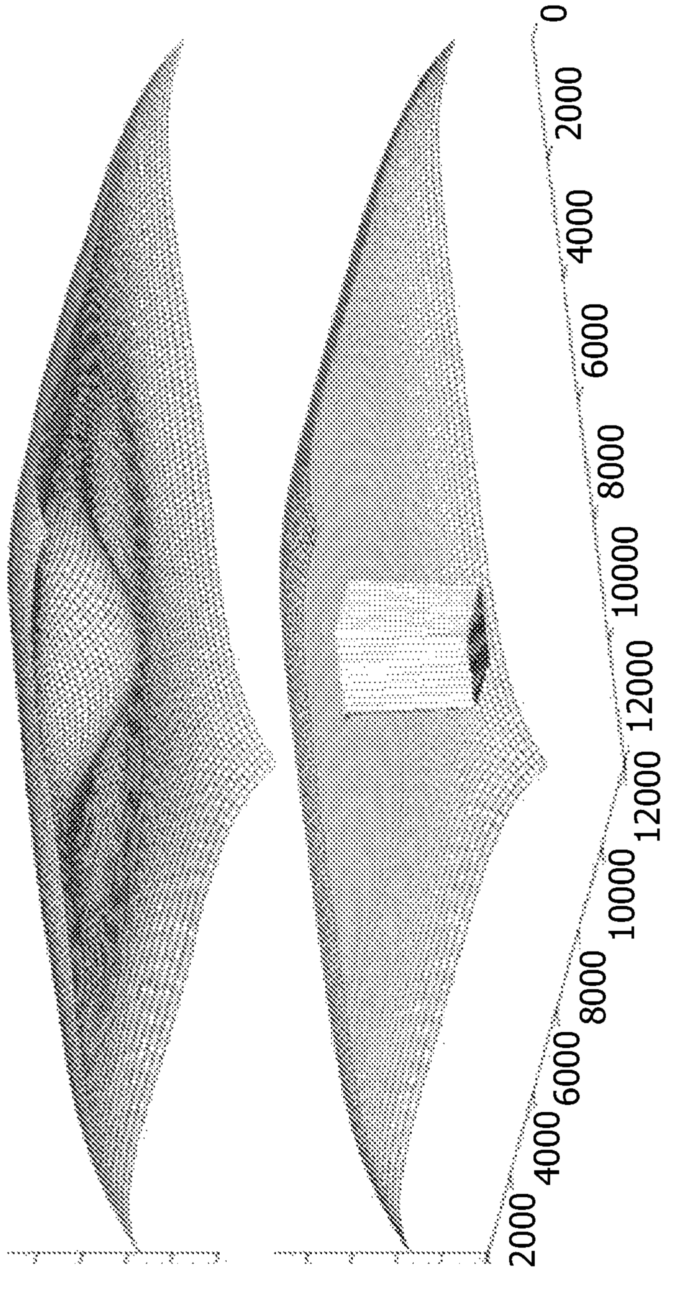
FIG. 13 is a schematic diagram illustrating an exemplary illuminance result in accordance with an exemplary embodiment of the present invention and the desired illuminance result.

Reference is now made to FIG. 13, where a schematic diagram illustrating an exemplary illuminance result in accordance with an exemplary embodiment of the present invention and the desired illuminance result is shown.

As shown in FIG. 13, the bottom part illustrates a desired illuminance distribution for a target area and the upper part illustrates an illuminance distribution for a target area which is obtained according to the present invention. The desired illuminance distribution makes it possible to reduce the illuminance of the target area so that the lighting decreases and the target area gets darker?, keeping the illuminance of other places unchanged. It can be seen that the solution of the present invention successfully reduces the illuminance of the target area and keeps the illuminance of other areas substantially unchanged.

According to embodiments of the present invention, a computer program product comprising a computer program that is tangibly embodied on a computer-readable medium is provided. The computer program may be configured to carry out the method according to the present invention. For example, the computer program may comprise: instructions for selecting at least one light module, which is associated with the illuminance of the place, from the at least one light source based on the position relationship between the at least one light source and the target area and a lighting distribution of each of the at least one light source; and instructions for adjusting at least one of the selected at least one light module.

Through the above descriptions, those skilled in the art would readily appreciate that embodiments of the present invention provide an effective mechanism for controlling illuminance of a target area in a lighting system to achieve personalized lighting for an open area. The lighting system (for example, the system 100 as shown in FIG. 1) may comprise at least one light source, each of the at least one light source comprises a plurality of light modules, and each of the plurality of light modules is adjustable independently. The lighting system may further comprise a controller, which may comprise an apparatus according to the present invention. By use of this configuration, it is possible to tailor or personalize the illuminance of a user's work area to his/her preference and activity without disturbing the working comfort of surrounding colleagues. Accordingly, user experience regarding the illuminance of a target area may be significantly and effectively improved.

In general, the various exemplary embodiments may be implemented in hardware or special-purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or by using some other pictorial representation, it is well understood that these blocks, apparatus, systems, techniques or methods described herein may be implemented in, as non-limiting examples, hardware, software, firmware, special-purpose circuits or logic, general purpose hardware or controller or other computing devices, or some combination thereof.

Specifically, various blocks shown in FIGS. 2 and 3 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations are to be performed in the particular order shown or in a sequential order, or that all illustrated operations are to be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of controlling illuminance of a target area in a lighting system, wherein the lighting system comprises at least one light source and each of the at least one light source comprises a plurality of light modules, an output level of each of the plurality of light modules being adjustable independently, wherein different light modules within each of the at least one light source differ in terms of lighting direction, the method comprising:

selecting at least one light module, which is associated with the illuminance of the target area, from the at least one light source based on the position relationship between the at least one light source and the target area and a lighting distribution of each of the at least one light source, that represents a light intensity of the light source in respective directions in a space; and adjusting the output level of at least one of the selected at least one light module.

2. The method of claim 1, wherein the selecting of at least one light module comprises:

calculating at least one relative direction of the target area from the at least one light source; and obtaining the position relationship between the at least one light source and the target area based on the at least one relative direction.

3. The method of claim 1, wherein the selecting of at least one light module comprises:

obtaining, from the position relationship, a relative direction of the target area from a light source;

obtaining, from the lighting distribution of the light source, lighting directions of a plurality of light modules emitting from the light source;

comparing the relative direction with the lighting directions; and selecting one light module from the plurality of light modules of the light source based on the comparison results.

4. The method of claim 1, wherein the adjusting at least one of the selected at least one light module comprises:

adjusting in proportion or independently the at least one light module to meet a lighting requirement.

5. The method of claim 1, wherein the lighting distribution of a light source is in a form of a triangle, a droplet, or a sector.

6. The method of claim 1, wherein the light module comprises at least one light emitting element; and wherein a light emitting element is a light emitting diode (LED), an organic light emitting diode (OLED) or a fluorescent.

7. A non-transitory computer readable medium comprising sequences of instructions tangibly embodied thereupon, the sequences of instructions that will cause at least one processor to carry out the steps of the method according to claim 1.

8. A controller for controlling the illuminance of a target area in a lighting system, wherein the lighting system comprises at least one light source and each of the at least one light source comprises a plurality of light modules, an output level of each of the plurality of light modules being adjustable independently, wherein different light modules within each of the at least one light source differ in terms of lighting direction, the controller configured to:

select at least one light module, which is associated with the illuminance of the target area, from the at least one light source based on the position relationship between the at least one light source and the target area and a lighting distribution of each of the at least one light source that represents a light intensity of the light source in respective directions in a space; and adjust the output level of at least one of the selected at least one light module.

9. The controller of claim 8, wherein the controller is further configured to:

calculate at least one relative direction of the target area from the at least one light source; and obtain the position relationship between the at least one light source and the target area based on the at least one relative direction.

10. The controller of claim 9, wherein the controller is further configured to:

obtain, from the position relationship, a relative direction of the target area from a light source;

obtain, from the lighting distribution of the light source, lighting directions of a plurality of light modules emitting from the light source;

compare the relative direction with the lighting directions; and select one light module from the plurality of light modules of the light source based on the comparison results.

11. The controller of claim 8, wherein the controller is further configured to:

adjust in proportion or independently the at least one light module to meet a lighting requirement.

12. The controller of claim 8, wherein the lighting distribution of a light source is in a form of a triangle, a droplet, or a sector.

13. The controller of claim 8, wherein the light module comprises at least one light emitting element; and wherein a light emitting element is a light emitting diode (LED), an organic light emitting diode (OLED) or a fluorescent.

14. A lighting system comprising:

at least one light source, each of the at least one light source comprising a plurality of light modules and an output value of each of the plurality of light modules being adjustable independently, wherein different light modules within each of the at least one light source differ in terms of lighting direction; and a controller configured to control illuminance of a target area in the lighting system by selecting at least one light module, which is associated with the illuminance of the target area, from the at least one light source based on the position relationship between the at least one light source and the target area and a lighting distribution of each of the at least one light source that represents a light intensity of the light source in respective directions in a space, and adjusting the output value of at least one of the selected at least one light module.

* * * * *